United States Patent
Lecuire et al.

(10) Patent No.: US 9,925,495 B2
(45) Date of Patent: Mar. 27, 2018

(54) ELECTROLYTE-SEPARATING MEMBRANE FOR SELECTIVE TRANSFER OF CATIONS THROUGH THE MEMBRANE AND PROCESS FOR MANUFACTURING SAID MEMBRANE

(71) Applicants: Centre National de la Recherche Scientifique, Paris (FR); Universite de Lorraine, Nancy (FR); Clotilde Boulanger

(72) Inventors: Jean-Marie Lecuire; Samuel Philippe Claude Kenzari, Andilly (FR); Elodie Guyot, Marly (FR); Sébastien Diliberto, Villers les Nancy (FR)

(73) Assignees: CENTRE NATIONAL DE LA RECHERCHE SCIENTIFIQUE, Paris (FR); UNIVERSITE DE LORRAINE, Nancy (FR)

( * ) Notice: Subject to any disclaimer, the term of this patent is extended or adjusted under 35 U.S.C. 154(b) by 441 days.

(21) Appl. No.: 14/769,284

(22) PCT Filed: Feb. 5, 2014

(86) PCT No.: PCT/EP2014/052199
§ 371 (c)(1),
(2) Date: Aug. 20, 2015

(87) PCT Pub. No.: WO2014/131586
PCT Pub. Date: Sep. 4, 2014

(65) Prior Publication Data
US 2016/0082395 A1 Mar. 24, 2016

(30) Foreign Application Priority Data
Feb. 26, 2013 (FR) ...................... 13 51699

(51) Int. Cl.
C02F 1/46 (2006.01)
B01D 61/42 (2006.01)
(Continued)

(52) U.S. Cl.
CPC ....... B01D 61/422 (2013.01); B01D 67/0002 (2013.01); C02F 1/469 (2013.01);
(Continued)

(58) Field of Classification Search
None
See application file for complete search history.

(56) References Cited

U.S. PATENT DOCUMENTS 7,938,941 B2 5/2011 Kashiwada
8,449,747 B2 5/2013 Boulanger
(Continued)

FOREIGN PATENT DOCUMENTS

CN 102935019 A 2/2013
WO WO 2009/007598 1/2009
(Continued)

OTHER PUBLICATIONS

PCT/EP2014/052199 International Search Report dated May 8, 2014 (6 pages including English translation).
(Continued)

*Primary Examiner* — Arun S Phasge
(74) *Attorney, Agent, or Firm* — Brinks Gilson & Lione; G. Peter Nichols

(57) ABSTRACT

An electrolyte-separating membrane includes a carrier made of a porous and permeable synthetic thermoplastic material that is larger than 0.8 mm in thickness and an active layer made of a material able to induce insertion and deinsertion reactions for selective transfer of cations through the membrane. The active layer is deposited on the carrier and is hermetic. The material of the active layer may in particular
(Continued)

be a molybdenum cluster chalcogenide. The invention aims to provide an electrolyte-separating membrane that is able to transfer cations selectively and that may be manufactured with large dimensions. The invention also relates to a cation transfer method employing this membrane and to a process for manufacturing said membrane, in particular by selective laser sintering of a powdered polymer.

14 Claims, 3 Drawing Sheets

(51) Int. Cl.
  *C02F 1/469* (2006.01)
  *B01D 67/00* (2006.01)
  *C08J 5/22* (2006.01)
  *C02F 1/461* (2006.01)
  *C02F 101/20* (2006.01)
(52) U.S. Cl.
  CPC ........... *C08J 5/2275* (2013.01); *C02F 1/4693* (2013.01); *C02F 2001/46138* (2013.01); *C02F 2001/46161* (2013.01); *C02F 2101/20* (2013.01); *C02F 2201/46115* (2013.01); *C08J 5/2206* (2013.01); *C08J 2377/02* (2013.01)

(56) References Cited

U.S. PATENT DOCUMENTS

| | | |
|---|---|---|
| 2004/0126638 A1 | 7/2004 | Chen |
| 2009/0120788 A1 | 5/2009 | Kashiwada |
| 2010/0252442 A1 | 10/2010 | Boulanger |
| 2013/0126354 A1 | 5/2013 | Lecuire |
| 2015/0119577 A1* | 4/2015 | Campos ............... C07C 213/10 546/348 |

FOREIGN PATENT DOCUMENTS

| | | |
|---|---|---|
| WO | WO 2011/039469 | 4/2011 |
| WO | WO 2012/010761 | 1/2012 |
| WO | WO 2012/010766 | 1/2012 |

OTHER PUBLICATIONS

Article, Dupin, Stéphane, "Étude fondamentale de la transformation du polyamide 12 par frittage laser: mécanismes physico-chimiques et relations microstructures/propriétés", Jul. 5, 2012, XP055I 14943, Laboratoire de recherche Ingénierie des Matériax Polymères (IMP), UMR 5223, INSA de Lyon, Bâtiment Jules Verne, 3éme étage 17 avenue Jean Capelle 69621 Villeurbanne, Cedex, France, retrieved from the Internet: http://theses.insa-lyon.fr/publication/2012ISAL0062/these.pdf [retrieved on Apr. 23, 2014] abrégé: partie intitulée "Analyse granulométrique" et figures A.28, A.29 (pp. 49 et 50).

Office Action and English language translation thereof, in corresponding Chinese Application No. 201480010742.0, dated Jun. 1, 2016, 15 pages.

Office Action and English language translation thereof, in corresponding Chinese Application No. 201480010742.0, dated Nov. 10, 2016, 18 pages.

Office Action and English language translation thereof, in corresponding Chinese Application No. 201480010742.0, dated Feb. 4, 2017, 7 pages.

* cited by examiner

ELECTROLYTE-SEPARATING MEMBRANE FOR SELECTIVE TRANSFER OF CATIONS THROUGH THE MEMBRANE AND PROCESS FOR MANUFACTURING SAID MEMBRANE

This application claims priority to International Application No. PCT/EP2014/052199 filed Feb. 5, 2014 and to French Application No. 1351699 filed Feb. 26, 2013; the entire contents of each are incorporated herein by reference.

TECHNICAL FIELD

The invention relates to an electrolyte-separating membrane for selective transfer of cations through the membrane, to a process for manufacturing said membrane and to a process for selective transfer of cations through said membrane.

PRIOR ART

A membrane formed with chalcogenides with a molybdenum cluster, is already known, notably $Mo_6X_8$ phases called Chevrel phases, described in International Patent Application WO 2009/007598, used for transferring cations through said membrane.

This document states that cations may be transported through the membrane in a material of formula $Mo_6X_8$ (with X=S, Se or Te) called Chevrel phases where reversible oxidation-reduction systems occur of the type:

$$Mo_6X_8 + xM^{n+} + xne^- \Leftrightarrow M_xMo_6X_8$$

wherein n is an integer and $M^{n+}$ is a metal cation. These systems are diversified by the nature of the cation $M^{n+}$, of the chalcogen X and of the stoichiometry x of the ternary $M^{n+}$.

In an experimental set-up applying the selective transfer process, the transfer membrane is placed between two compartments respectively including an electrode in platinum-plated titanium which operates as an anode and a metal electrode (in stainless steel, aluminium, copper or platinum-coated titanium) or in glassy carbon which operates as a cathode. The first compartment contains a first electrolyte which contains different cations of an effluent to be treated. The second compartment contains a second electrolyte intended to receive the selected cations.

An electric direct current is established between the anode and the cathode. In the global electrochemical operation of the set of both compartments, insertion of the cation occurs at the $M_xMo_6S_8$/first electrolyte interface (effluent to be treated, mixture of the cations M', $M'''^+$, $M''''^+$, for example), according to:

$$Mo_6X_8 + xM^{n+} + xne^- \Leftrightarrow M_xMo_6X_8$$

The de-insertion of this same cation $M^{n+}$ at the $M_xMo_6S_8$/second electrolyte interface (solution for adding value to $M^{n+}$ for example) is carried out reciprocally according to $$M_xMO_6X_8 \Leftrightarrow MO_6X_8 + XM^{n+} + xne^- + xM^{n+}$$

The mobility of the metal cation in the Chevrel phase thus allows transfer of the desolvated cation $M^{n+}$ from one medium to the other without transfer of any other chemical species of either one of the compartments.

A transfer membrane as a disc is obtained by hot sintering of a mixture of composition powder adapted to the stoichiometry of the desired material. In this way, discs of active material with a thickness from 2 to 5 millimeters are thereby obtained.

The tests with membranes consisting of selenated and sulfur-containing phases have shown that in particular the cations of the following metals may be transferred from one electrolyte to the other: iron, manganese, cobalt, nickel, copper, zinc, cadmium. The current density limits obtained are comprised between 10 and 20 A/m², with Faradic yields of more than 90%, or even more than 98%, and with very good selectivity.

The tests have also shown that the transfer rate increased with decreasing of the thickness of the membrane. However, the required mechanical strength of the membrane limits the reduction of its thickness.

In document WO 2012/010766 A1, the making of a transfer membrane including two layers was proposed. A supporting layer is made for example in a porous ceramic material and a second so-called active layer is deposited on the support. The deposition of the second layer is achieved by coating with a composition comprising the active material as a powder, a binder and a solvent. The solvent is evaporated subsequently. The thereby produced active layer has a thickness of the order of 50 to 100 µm and is sealed. On the other hand, the support is pervious and allows an electrolyte contained on the side of the support to attain the active layer. The reactions discussed earlier may develop. The use of such a membrane retains the previous results in terms of Faradic yields, but gives the possibility of attaining current densities multiplied by five or more.

This document also states that the host lattice of the active layer may also be selected from metal chalcogenides or compounds of lithium and of a metal as an oxide, phosphate or fluoride, the metal being selected from nickel, cobalt, iron, manganese, vanadium or titanium. Such host lattices are also capable of transferring metal cations, and in particular lithium.

The manufacturing of the supports in ceramic is easy on small samples, but it is difficult to strongly increase the dimensions of these supports, which limits the possibilities of industrially utilizing the process.

The invention is directed to providing an electrolyte-separating membrane with an active layer of a material capable of developing insertion and de-insertion reactions for selective transfer of cations through the membrane which may be manufactured with large dimensions.

DESCRIPTION OF THE INVENTION

Considering these goals, the object of the invention is a membrane including a support consisting of a porous and pervious material and of an active layer of a material capable of developing insertion and de-insertion reactions for selective transfer of cations through the membrane, the active layer being deposited on the supporting and leak-proof layer, characterized in that the support is in a thermoplastic synthetic material.

By using a synthetic material for the support, one gets rid of the large size manufacturing problems of the ceramic supports. It is ascertained that it is possible to manufacture such supports with large dimensions while retaining the transfer performances through the active layer. In particular, it is ascertained that the active layer may be applied on the synthetic support in the same way as on the ceramic support. The nature of the support is compatible with most of the electrolytes which may be used in applications with selective transfer of cations, such as solutions of acid or of salts.

According to Particular Features:

the porosity of the support is comprised between 20 and 60% of the volume fraction, the samples with a porosity in this range gave the possibility of demonstrating the operation of the selective transfer process;

the synthetic material is selected from a group including polyamide, amide copolymers, polyacetates, polyethylenes and polyether-ether-ketone; these thermoplastic materials are sufficiently resistant in mechanical terms and in chemical terms in connection with the nature of the electrolytes used; they are also suitable for a manufacturing method as discussed hereafter;

the material of the active layer is a metal chalcogenide; more particularly, the metal chalcogenide is for example a chalcogenide with a molybdenum cluster ($Mo_nX_{n+2}$ or $M_xMo_nX_{n+2}$) wherein M is a metal and X is a chalcogen selected from the group of S, Se and Te;

alternatively, the material of the active layer is a compound of lithium and of a metal as an oxide, phosphate or fluoride or of a combination of these forms, the metal being selected from a group including nickel, cobalt, iron, manganese, vanadium, titanium and tungsten;

the active layer has a thickness of more than 50 µm; the sealing conditions of the active layer are attained from this thickness.

The object of the invention is also a method for manufacturing a membrane as described earlier, according to which a solution is prepared, comprising an active material as a powder, a binder and a solvent, and the surface of a support in porous material is then coated with said solution and the solvent is evaporated in order to form a leak-proof active layer on the support, characterized in that the support is in a thermoplastic synthetic material.

Particularly, the support is obtained by additive manufacturing of layers and selective laser sintering of a polymer as a powder. Successive layers of polymeric material as a powder are spread out and certain areas are selectively heated in order to partly melt the powder grains so that they agglomerate. The heating power is adjusted so that the melting of the grains is not complete so that spaces made between the grains remain. These spaces then form the pores of the support which is thereby built. Certain pores remain open and impart perviousness to the support. The surface of the thereby obtained support is not smooth and the active layer which is deposited thereon by coating adheres well to the support.

According to other features, the powdered polymer has a grain size comprised between 1 and 120 µm, preferably between 10 and 80 µm, or even between 40 and 75 µm. The size of the grains also determines the size of the pores of the support which preferably has to be close to the size of the grains of the active material powder. Actually it is in this way that the sealing of the active layer is obtained the most easily, i.e. with the minimum thickness for the active layer. Obtaining a small thickness gives the possibility of preserving the current density which may be obtained.

The object of the invention is also a selective extraction method for cations by electrochemical transfer according to which a first electrolyte containing cations and a second electrolyte are separated by a separation membrane, characterized in that a transfer membrane as defined earlier is used as a separation wall of the electrolytes, and transfer of the cations through said transfer membrane is ensured by generating a potential difference ($\Delta E$) between either one anode in the first electrolyte and a cathode in the second electrolyte, or between an anode in the first electrolyte and said transfer membrane, so as to cause insertion of the cations into the active layer of the transfer membrane on the side of the first electrolyte, diffusion of the cations into the active layer, and then their de-insertion in the second electrolyte.

SHORT DESCRIPTION OF THE FIGURES

The invention will be better understood and other particularities and advantages will appear upon reading the description which follows, the description referring to the appended drawings wherein.

DETAILED DESCRIPTION

Figure 1:
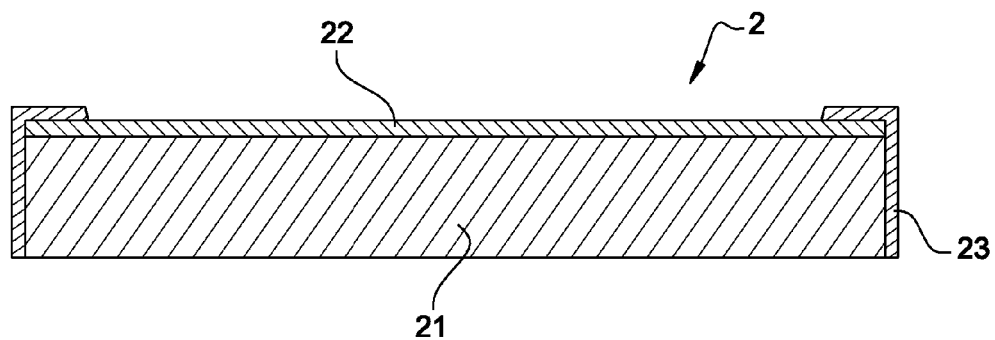
FIG. 1 is a sectional view of a transfer membrane according to the invention.
Figure 2:
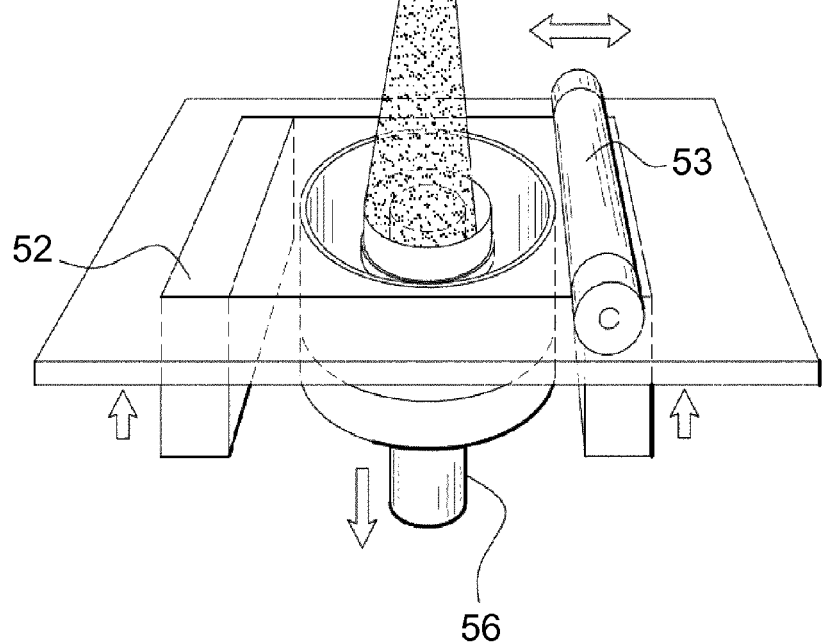
FIG. 2 is a view of a facility for building a membrane according to the invention by selective sintering with a laser.

A transfer membrane 2 according to the invention is formed with a porous support 21 in a synthetic material onto which a thin active layer 22 has been deposited. The manufacturing of the leak-proof membrane 2 is carried out in a first phase for manufacturing the support 21, and in a second phase for applying the active layer 22 on the support 21. By leak-proof is meant the absence of any detectable transfer of an aqueous solution from one side to the other of the active layer exposed to the solution, the membrane acting as a container of the solution.

Elaboration of the Porous Substrate

The support 21 is manufactured, in this embodiment of the invention, by selective laser sintering of thermoplastic polymer powder.

Powders are used having a grain size comprised between 1 and 120 µm, but for which the essential portion of the grain size is centered between 10 and 80 µm, or even between 40 and 75 µm. The main tests were conducted with polyamide 6, polyamide 11 or polyamide 12.

The selective laser sintering device 5 comprises a powder supply tank 52 in which is placed the powdered polymer, a roller 53 for providing and distributing powder, as well as a laser 54. The laser is for example an infrared radiation laser with variable power (10 to 60 W). The laser beam is directed via a mirror 55 to the powder area which one wishes to sinter, under a preferably neutral atmosphere, for example under a nitrogen atmosphere.

The method uses a manufacturing platform 56 heated to a temperature close to the melting temperature of the selected polymer. In a particular embodiment, the mixture of powders is heated up to a temperature lower than the melting temperature of the polymer by a few degrees Celsius, for example up to a temperature of less than the melting temperature of the relevant polymer by 1 to 10° C. The energy required for the melting is then provided by the laser 54.

The laser 54 traces the shape of the membrane, layer by layer and locally provides, at each successive stratum of powders, sufficient heat energy for bringing the polymer to a temperature causing its at least partial melting at the surface of the grains. The non-sintered powders naturally ensure support of the following layers. The manufacturing platform 56 is movable and moves down by the thickness of a layer (100 µm), the displacement of the vertical part being ensured by a piston. A new powder layer is then spread out by the roller 53 and the cycle starts again in order to build the porous support, layer by layer, from bottom to top. Instead of the roller 53, it is also possible to use another mechanical system such as for example a doctor blade.

By partly carrying out the melting of the powders, the grains agglomerate while remaining in grain form and leaving pores between them before again solidifying. The apparent density of the thereby produced samples, measured by the apparent specific gravity over the theoretical specific gravity of the material of the powders, is comprised between 40 and 80%. The corresponding porosity level is therefore comprised between 20 and 60%, the majority of the samples having a porosity level comprised between 30 and 50%. An immersion of the support in water for 15 min shows that the support 21 absorbs water and therefore that a portion of the pores are open.

The thickness of the support may be selected according to mechanical stresses against which the membrane should resist, but samples with a thickness of 1 mm were produced successfully.

Figure 3:
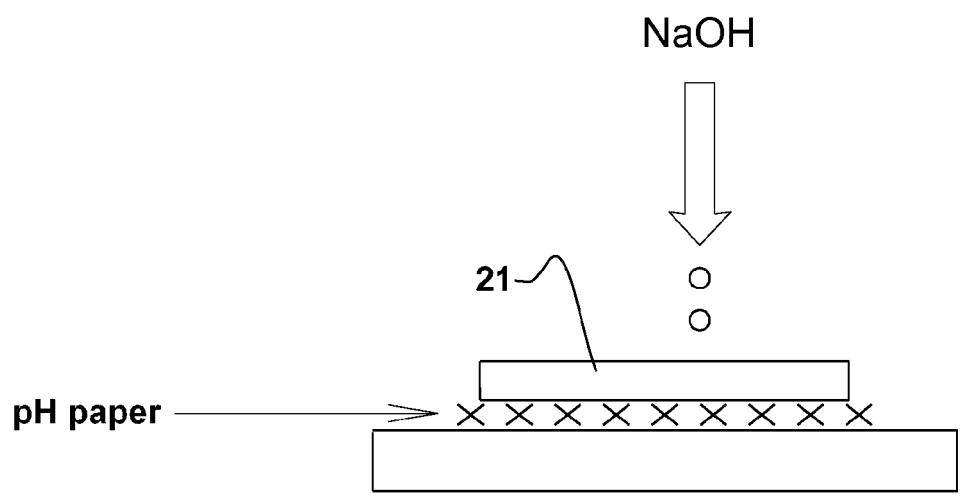
FIGS. 3 and 4 are schematic views of a test set up for checking the porosity or the sealing of the membrane of FIG. 1.

The validation of the permeability of the support was achieved by means of pH paper and of an OH⁻ tracer of a soda solution at 0.05 mol/L i.e. 2 g/L in 50% by volume of water and 50% by volume of ethanol in the following way illustrated by the diagram of FIG. 3: The support is deposited on pH paper; some tracer is poured on the support; the changing color of the pH paper after a few seconds gave the possibility of confirming good porosity and permeability of the support since the tracer crossed the support.

Elaboration of the Active Layer

The second phase for manufacturing the membrane consists in physically coating one face of the porous support 21. In the example which is shown, coating is achieved with a suspension of a Chevrel phase, of formula $Mo_6X_8$, with X being a chalcogen, in a volatile solvent. The active layer is prepared from powdered compounds $Mo_6S_8$ or $Mo_6Se_8$ which form the active mass. An addition of poly(vinylidene fluoride), designated as PVDF in the international nomenclature and hereafter plays the role of a binder.

The phases $Mo_6S_8$ and $Mo_6Se_8$ are derived from a ceramic synthesis as for example described in document WO 2012/010766, on pages 10 and 11 of the description.

Elaboration of the Active Layer by Coating

Case of the Chevrel Phase Matrix

A suspension consisting of 95% of Chevrel phases as a powder and 5% of PVDF is formed in 1-methyl-2-pyrrolidone, called NMP subsequently, in an amount of 0.95 g of the solid $Mo_6S_8$ or $Mo_6Se_8$ phase, 0.05 g of PVDF dispersed in 2 ml of NMP. The whole is subject to stirring for 2 hours.

Figure 4:
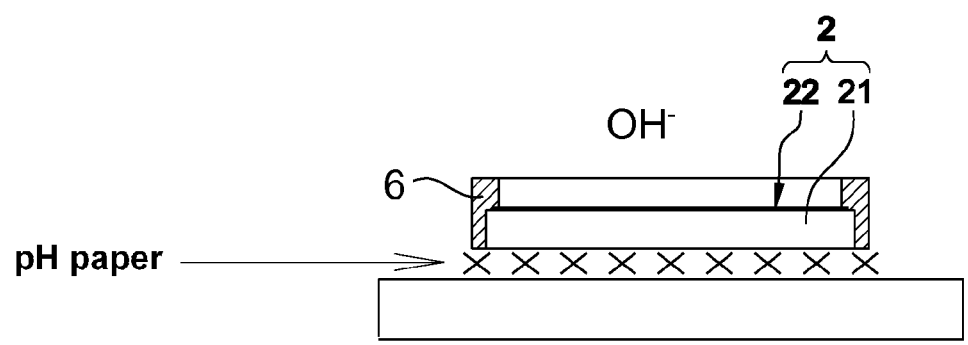

The treating of the support is carried out by applying the suspension of $Mo_6S_8$ or $Mo_6Se_8$ NMP-PVDF on the surface of the porous support with a brush in order to cover in a more uniform way the whole surface. Next, the whole is put into the oven for 1 h in order to remove the NMP solvent. Under these conditions, the resulting film of $Mo_6S_8$ and $Mo_6Se_8$ adheres to the surface of the support 21 with thicknesses of the order of 80 μm. Further, the sealing tests are conducted according to FIG. 4, by applying a border 6 to the sample 2 around the active layer 22 and by pouring a solution of soda at 2 g/L into water/ethanol in the thereby formed reservoir. The transfer membrane 2 is made on pH paper, the active layer 22 being partly above. The tests confirm proper occlusion of the pores of the porous support, because the pH paper does not change color, even after 6 hours. Electrical conductivity tests show good electric contact between the grains.

The different tests have shown that the sealing is attained when the thickness of the active layer is of the order of 80 μm.

Case of the Oxide Matrix of the $LiN_yO_z$ Type

According to another example, the membrane is manufactured with as active material, a $Li_xCoO_2$, $LiMn_2O_4$, $LiV_3O_8$, $LiNiO_2$, $LiWO_3$, or $LiMnO_2$ matrix generically designated by the formula $Li_xM_yO_z$. The elaboration principle remains coating of the porous support with a suspension of $Li_xM_yO_z$.

The coating solution is prepared from a powdered mixture $Li_xM_yO_z$ which forms the active material at 80% by mass, from 10% PVDF which plays the role of a binder and from 10% carbon which ensures electric conductivity. The mixture is intimately homogenized in a mortar.

A suspension is produced in 1-methyl-2-pyrrolidone with stirring for 2 hours in an amount of 1 g of powder mixture for 2 ml of NMP.

The coating of the support is carried out by applying over the whole surface the $Li_xM_yO_z$/PVDF/graphite suspension in NMP by means of a brush for covering in the most uniform way the whole surface. Next, the whole is put into the oven for 1 h in order to remove the NMP solvent. Under these conditions, the resulting oxide film adheres to the surface of the support with thicknesses of the order of 80 μm. Further, the sealing tests confirm proper occlusion of the pores of the porous support. Electric conductivity tests show good electric behavior of the film.

Regardless of the type of matrix, in order to track the interface potentials, it is necessary to set into place an electric contact around the membrane by means of a graphite lacquer 23. The contour of the membrane is painted and paint overflows onto the face of the active layer 22.

Selective Transfer Process

Figure 5:
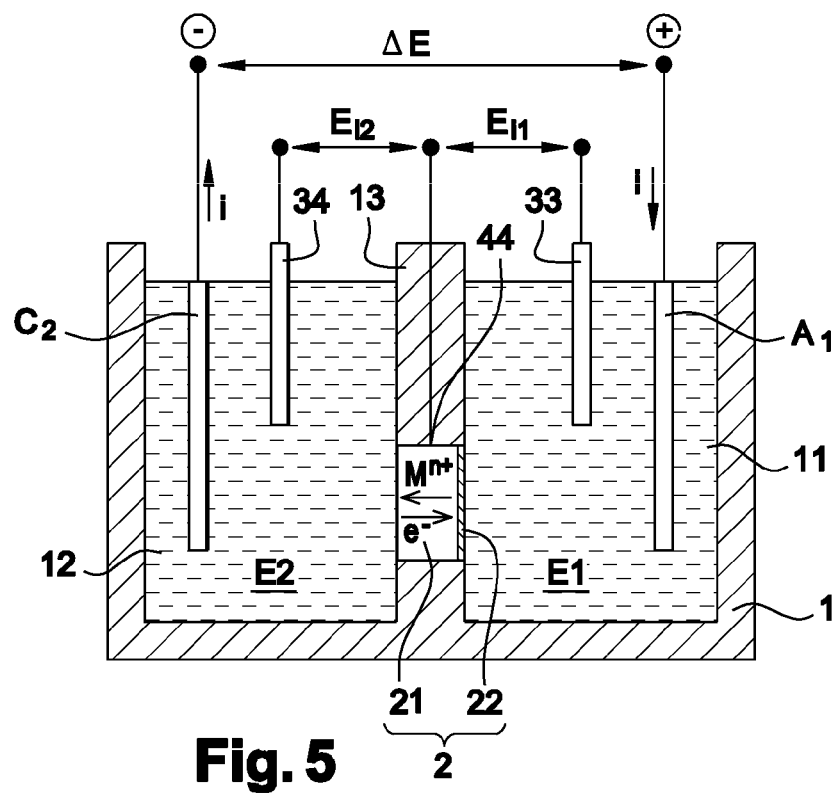
FIG. 5 is a block diagram of a selective transfer device between two electrolytes.

The diagram of FIG. 5 shows a device for applying a selective transfer process using transfer membranes according to the invention. The device includes a tank 1 including two compartments 11 and 12, adapted for receiving an electrolyte and separated by a separation partition 13 in which is placed a transfer membrane 2, sealably mounted in the partition 13.

The device also includes an anode A1 placed in the first compartment 11 and a cathode C2 placed in the second compartment 12. A potential difference ΔE may be applied between the anode A1 and the cathode C2 by means known per se, in order to impose and control a current i between the electrolytes E1 and E2. The anode A1 is for example an electrode in platinum-coated titanium and the cathode C2 is for example a metal electrode (in stainless steel, aluminium, copper or platinum-coated titanium) or in glassy carbon.

The active layer 22 is placed on the side of the first compartment 11, even if the system also operates when it is on the side of the second compartment 12. A movable contact system with a spring 44 ensures electric connection with the contour of the membrane 2 covered with graphite lacquer, and allows the latter to be connected to a control device, notably adapted for measuring the interface potential Ei1, Ei2 of the transfer membrane 2 relatively to reference electrodes 33, 34 respectively positioned in each compartment 11, 12 of the tank 1, as illustrated in FIG. 5.

The application of the device is typically carried out in the following way:

The compartments 11 and 12 are filled with the desired electrolyte, for example and in a by no means limiting way, with a solution of mixtures of cations $M_{(i)}$ in a concentration at least equal to $10^{-3}$ mol/L as a first electrolyte E1 in the first compartment 11, and with 100 ml of 0.5 M $Na_2SO_4$ as a second electrolyte E2 in the second compartment 12, with $M_{(i)}$) being one or several metal cations which one wishes to separate and respectively designated by $M^{n+}$, $M'^{n+}$, $M''^{n+}$, $M'''^{n+}$. The anode A1 is placed in the first compartment 11 and the cathode C2 in the second compartment 12, and the contact 44 of the membrane is connected with potentiometric control means, connected to the reference electrodes 33, 34 immersed in the electrolytes E1 and E2. It is thus possible to control the interface potentials and accordingly adjust the intensity between the anode A1 and the cathode C2, so as to obtain a current density referred to the operational surface area of the transfer membrane 2, or of the whole of the transfer membranes positioned in parallel, for example comprised between 2 and 200 A/m².

Overall intensio-static conditions are established between the anode A1 and the cathode C2. Let us designate by HL, for host lattice, the material of the active layer 22. In the overall electrochemical operation of the whole of the two compartments, the electrolyte E1 being an initial solution to be treated including a mixture of cations of different metals and of identical or different charges, $M^{n+}$, $M'^{n+}$, $M''^{n+}$ for example and the electrolyte E2 being a solution for adding value to the metal M, there occurs:

insertion of the cation $M^{n+}$ at the interface of the active layer 22 with the electrolyte E1, according to:

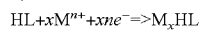

$$HL + xM^{n+} + xne^- => M_xHL$$

de-insertion of this same cation at the interface of the active layer 22 with the electrolyte E2 (solution for adding value to $M^{n+}$ for example), which is carried out reciprocally according to:

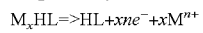

$$M_xHL => HL + xne^- + xM^{n+}$$

The mobility of the metal cation in the host lattice thus allows transfer of the de-solvated cation $M^{n+}$ from one medium to the other without any transfer of any other chemical species from either one of the compartments.

It will further be noted generally that the electrolytes placed in both compartments 11, 12 including the anode A1 and the cathode C2, may be different, notably by the nature of the background salts, by the acidity level, by the presence of complexing agents, by the nature of the solvents, notably non-aqueous organic or mineral solvents (DMSO, DMF, ionic liquids, solid electrolytes, etc). Thus for example, it is possible to carry out ion transfer from a sulfate medium to a chloride medium without diffusion of said medium.

Example 1

The support is made in polyamide 12, in several samples for which the porosity is comprised between 30 and 50% and the thickness is 0.9±0.1 mm. The active layer is based on $LiMn_2O_4$ and has a thickness of the order of 80 μm.

The first electrolyte E1 is a 0.5 mol/L aqueous solution of lithium sulfate, i.e. 7 g/L of lithium and 0.5 mol/L of sodium sulfate, i.e. 11.5 g/L of sodium.

The second electrolyte is a 0.05 mol/L sodium sulfate solution, i.e. 7.8 g/L of potassium.

A stable current with an intensity of 110 A/m² is established. Thus 28 g·h⁻¹·m⁻² of lithium are thus selectively transferred from the first to the second electrolyte with a Faradic yield of 94%.

Example 2

The support is made in polyamide 12, in several samples for which the porosity is comprised between 30 and 50%. The active layer is based on $Mo_6S_8$ and has a thickness of the order of 80 μm.

The first electrolyte E1 is a 0.1 mol/L aqueous cobalt sulfate solution at, i.e. 5.9 g/L of cobalt and of 0.1 mol/L nickel sulfate, i.e. 5.8 g/L of nickel.

The second electrolyte is a 0.05 mol/L aqueous sodium sulfate solution, i.e. 2.3 g/L of sodium.

A stable current with an intensity of 70 A/m² is established. Thus 154 g·h⁻¹·m⁻² of cobalt are transferred from the first to the second electrolyte with a Faradic yield of 98%. The nickel is not transferred.

Example 3

The support is made in polyamide 12, in several samples, for which the porosity is comprised between 30 and 50%. The active layer is based on Chevrel phases $Mo_6Se_8$ and with a thickness of the order of 80 μm.

The first electrolyte E1 is an aqueous cadmium sulfate solution at 1 mol/L, i.e.

112 g/L of cadmium and of nickel sulfate at 1 mol/L, i.e. 59 g/L of nickel.

The second electrolyte is a 0.05 mol/L solution of sodium sulfate, i.e. 2.3 g/L of sodium.

A stable current with an intensity of 70 A/m² is established. Thus 293 g·h⁻¹·m⁻² of cadmium are selectively transferred from the first to the second electrolyte with a Faradic yield of 99%. The nickel is not transferred.

The invention claimed is:

1. A membrane for separating electrolytes comprising a support comprising a porous and pervious material and an active layer of a material able to develop insertion and de-insertion reactions for selective transfer of cations through the membrane, the active layer being deposited on the support and sealed, the sealing being evaluated by the absence of detectable transfer of an aqueous solution from one side to the other of the active layer exposed to the solution for a period of more than 6 hours, the membrane acting as a container for the solution, wherein the support is a thermoplastic synthetic material with a thickness of more than 0.8 mm.

2. The membrane according to claim 1, wherein the porosity of the support is between 20% and 60% of the volume fraction.

3. The membrane according to claim 1, wherein the thermoplastic synthetic material is selected from a group including polyamide, amide copolymers, polyacetates, polyethylenes and polyether-ether-ketone.

4. The membrane according to claim 1, wherein the material of the active layer is a metal chalcogenide.

5. The membrane according to claim 4, wherein the metal chalcogenide is a chalcogenide with a molybdenum cluster ($Mo_nX_{n+2}$ or $M_xMo_nX_{n+2}$) wherein M is a metal and X is a chalcogen selected from the group of S, Se and Te.

6. The membrane according to claim 1, wherein the material of the active layer is a compound of lithium and of a metal as an oxide, a phosphate or fluoride or a combination of these forms, the metal being selected from the group consisting of nickel, cobalt, iron, manganese, vanadium and titanium.

7. The membrane according to claim 1, wherein the material of the active layer is a compound of lithium and of tungsten as an oxide, phosphate or fluoride or of a combination of these forms.

8. The membrane according to claim 1, wherein the active layer has a thickness of more than 50 μm.

9. A method for manufacturing a membrane comprising:
preparing a solution comprising an active material as a powder and that is able to develop insertion and deinsertion reactions for selectively transferring cations through the membrane, a binder, and a solvent;

thereafter, coating a surface of a porous material support with the solution;

removing the solvent to form a sealed active layer on the support, the sealing being evaluated by the absence of any detectable transfer of an aqueous solution from one side to the other of the active layer exposed to the solution for a period of more than 6 hours, the membrane acting as a container for the solution, wherein the support is a thermoplastic synthetic material with a thickness of more than 0.8 mm.

10. The method according to claim 9, wherein the support is obtained by additive manufacturing of layers and selective laser sintering of a powdered polymer.

11. The method according to claim 10, wherein the powdered polymer has a grain size comprised between 1 and 120 μm.

12. The method according to claim 10, wherein the powdered polymer has a grain size comprised between 10 and 80 μm.

13. The method according to claim 10, wherein the powdered polymer has a grain size comprised between 40 and 75 μm.

14. A method for selective extraction of cations by electrochemical transfer where a first electrolyte containing cations and a second electrolyte are separated by a separation membrane comprising a thermoplastic synthetic material support in with a thickness of more than 0.8 mm on which is deposited a sealed active layer and transfer of cations through the membrane is achieved at least by generating a potential difference either between an anode in the first electrolyte and a cathode in the second electrolyte, or between an anode in the first electrolyte and the membrane, so as to cause insertion of the cations in the active layer of the membrane on the side of the first electrolyte, a diffusion of the cations in the active layer, and then their de-insertion in the second electrolyte.

* * * * *

UNITED STATES PATENT AND TRADEMARK OFFICE
CERTIFICATE OF CORRECTION

PATENT NO. : 9,925,495 B2  
APPLICATION NO. : 14/769284  
DATED : March 27, 2018  
INVENTOR(S) : Clotilde Boulanger et al.

Page 1 of 1

It is certified that error appears in the above-identified patent and that said Letters Patent is hereby corrected as shown below:

On the Title Page

Item (12), delete "Lecuire et al." and insert --Boulanger et al.--.

Item (71), immediately after "Nancy (FR)" delete "; Clotilde Boulanger".

Item (72), before "Jean-Marie Lecuire;" insert --Clotilde Boulanger;--.

Signed and Sealed this  
Twenty-fifth Day of June, 2019

Andrei Iancu  
*Director of the United States Patent and Trademark Office*